United States Patent [19]

Grimm et al.

[11] 4,027,826

[45] June 7, 1977

[54] CHOPPING MACHINE PARTICULARLY FOR THE HARVEST OF CORN COBS AND THEIR COMMINUTION

[75] Inventors: Klaus Grimm, Freising-Weihenstephan, Germany; Alois Mengele, deceased, late of Gunzburg, Germany, by Dieter Kark Paul Mengele, legal representative

[73] Assignee: Karl Mengele & Sohne, Guenzburg, Danube, Germany

[22] Filed: July 31, 1975

[21] Appl. No.: 600,915

[30] Foreign Application Priority Data

Feb. 7, 1975 Austria .................................. 941/75

[52] U.S. Cl. .................................. 241/221; 241/294
[51] Int. Cl.² .......................................... B02C 18/18
[58] Field of Search ..................... 241/221, 222, 294

[56] References Cited

UNITED STATES PATENTS

| | | | |
|---|---|---|---|
| 2,829,695 | 4/1958 | Jarvis | 241/294 |
| 3,348,594 | 10/1967 | Hoch | 241/222 UX |
| 3,357,467 | 12/1967 | Morkoski | 241/222 X |
| 3,805,660 | 4/1974 | Burrough | 241/222 UX |

Primary Examiner—Roy Lake
Assistant Examiner—Howard N. Goldberg
Attorney, Agent, or Firm—Toren, McGeady and Stanger

[57] ABSTRACT

In a forage harvester, a plurality of spaced knife supports are angularly spaced apart around the periphery of a rotatable cutter drum. A straight beater bar is displaceably fixed to each knife support so that the beater bars have an impact edge which rotates past a counterknife at the inlet of the harvester. The side surfaces of the beater bars leading in the direction of rotation are disposed at a slight angle to the side surfaces of the counterknife. The beater bars are spaced apart at about 15 to 20 degrees relative to the axis of rotation of the cutter drum and the dimension of the overall arrangement is such that the spacing between impact edges of adjacent beater bars is about 60 to 100 mm.

6 Claims, 2 Drawing Figures

CHOPPING MACHINE PARTICULARLY FOR THE HARVEST OF CORN COBS AND THEIR COMMINUTION

The invention concerns a forage harvester particularly for corn ear harvesting and-comminution with a cutter assembly consisting of a cutter drum or a wheel disk and a counterknife with a picking attachment and feeding system arranged in the cutter inlet.

In a known appartus of this type, also called a recutter, a multi-blade highspeed drum is used which is enclosed by a screen-type cage through which the ears are driven as in a hammer mill. The comminuted material is then conveyed by means of a blower.

Forage harvesters of this type have a high power consumption and a low processing capacity; in addition, they have a high material-consumption and require much attendance.

For this reason drum-type forage havesters have been provided, for example, with exchangeable picking attachments, and beating tools have been arranged on the inner circumference of the drum parallel to the circumferential slot. These beating tools, however, have only a threshing effect for the most part, and have likewise a high power consumption.

A particular disadvantage in all these systems is that the membranous leaf parts are also comminuted. These fibrous forage components can hardly be sorted out anymore if they are undesired for feeding. (fattening pigs); while, on the other hand, the fibers should be coarse-structured for feeding bulls to maintain the paunch flora.

The object of the invention is therefore to provide a forage harvester for the simple and effective comminution of corn ears and corn cob spindles where the membranous leaf parts are less comminuted with sufficient comminution of the ears.

The problem underlying the invention is solved by a forage harvester of the above mentioned type where straight beater bars, displaceable on knife supports and arranged with a flat blade angle toward the opposite cutting edge, serve as chopping knives.

Surprisingly a high degree of comminutation of the corn cobs and corn ears engaged by the feeding system is achieved with the forage harvester according to the invention, while the fibrous membrane parts are pulled through during the beating mostly without being comminuted or only slightly comminuted, so that they can subsequently be sorted out easily.

It was found expedient to arrange the beater bars in an angle of about 15 – 20 degrees relative to the axis of rotation, and to design the knife sequence of the cutter drum or disk wheel so that the spacing from impact edge to impact edge is about 60 – 100 mm. Since only spring steels are required for this purpose, the expenditures and maintenance are less, despite a greater number of knives than with ground knives with complicated cutting edge curves.

The increasing cutting sequence, due to the great number of knives in the subject of the invention, has an effect which has often been tried but never achieved heretofore, which consists in that the material cushion arranged in the cutting frame can not spring back after the respective cut.

The beater bars, which are arranged practically radially in a drum type cutter assembly, enhance in an advantageous manner the ejection of the cut material, since the particles of the cut material can easily move to the outside as on radial blades, and a good conveyor action is achieved even with a lower material throughout.

Besides, the friction losses between the end faces of the beater bars and the counterknife are lower than in relief-ground knives, for example, which are generally used.

In a further development of the subject of the application, the beater bars are arranged in a cutting angle (rake angle) of about 8 degrees relative to the counterknife.

Another advantage is that the cutter drum or cutter disk according to the invention has a great flywheel mass, so that it can easily absorb the peak forces appearing in the combination of corn ears. For this reason the power consumption can be expected to be much lower than in cutting drums or cutting disks with knives.

If the drum-type forage harvester according to the invention is also equipped — as provided — with a chafing base (beater bars etc.) it is particularly well utilized in cutter drums, for example, by the favorable sliding of the particles down the beater bars forming the blade surfaces.

According to another finding of the invention, the intended unequal comminution effect is further enhanced by the fact that the inlet and the charging trough are wide, so that the cobs impinging on the beater bars are deflected with their cob axis into a parallel position to the knife edges. The membranous leaves are removed practically without being comminuted. For this reason the principle of the invention is particularly suitable for multiple-row apparatus having a correspondingly wide inlet.

The forage harvester according to the invention can be converted in a simple manner particularly to a universal chopper for other agricultural cut products if the beater bar drum or —disk is replaced by one with normal knives with a corresponding replaceability of the gripping appliance.

The same effect can also be achieved if normal knives on various beater bars and/or knife supports are provided with flat portions corresponding to their blade angle and can be screwed on there additionally. Naturally the picking attachment must be replaceable in all these cases by other gripping appliances.

The invention is represented in the drawings in an embodiment of a cutter drum assembly and described more fully below.

Figure 1:
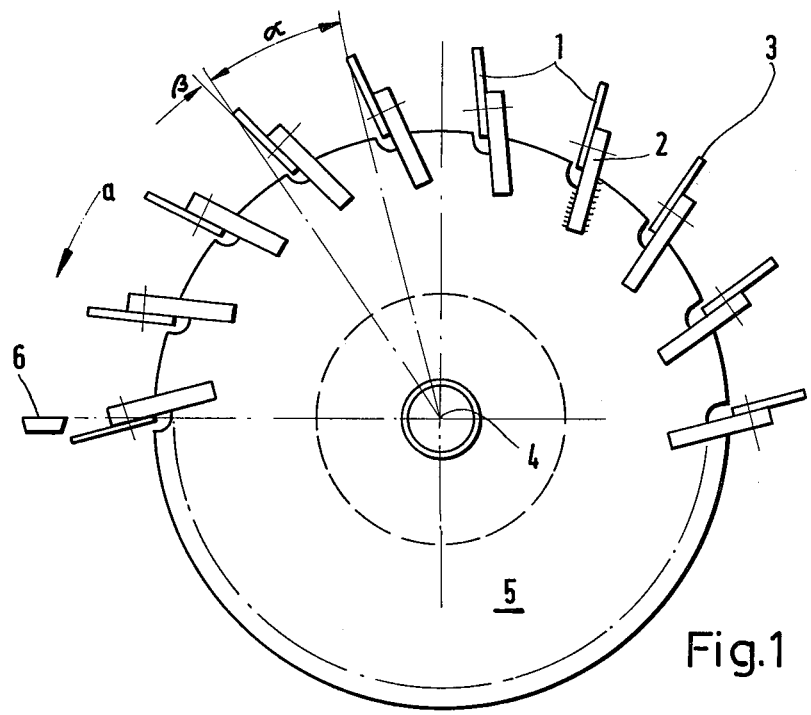
FIG. 1 shows a cutter drum in a side elevation

Used as cutting elements of the harvester, according to the invention, are beater bars 1 which are displaceable in axial direction and so screwed on knife supports 2 that all points of their front impact edges 3 are equally spaced from the drum axis 4. The cutter drums 5 consist of at least two disks.

As it can be seen further, the knives are arranged in the embodiment in an angle of 20 deg. relative to the axis of rotation. 6 is the counterknife arranged in the inlet (not shown).

The impact edge 3 of the beater bars 1 touches the material to be cut during the revolution of the cutter drum on the upper edge of the inlet (not shown) and compresses here at first the part of the cut material issuing from the inlet and then knocks it off on the counterknife 6.

Figure 2:
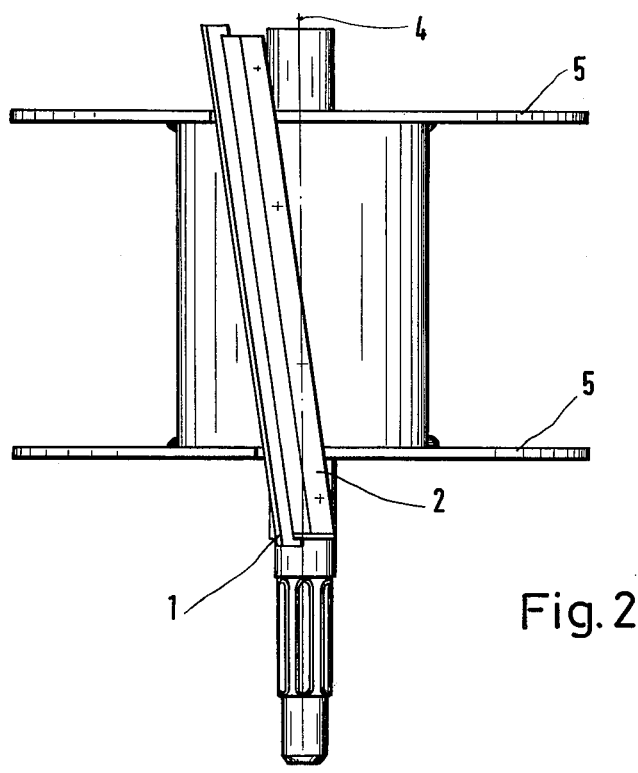
FIG. 2 shows a top view of the cutter drum circumference with a schematically represented beater bar.

As it can be seen from FIG. 2, the bearer bars have a cutting angle B (rake) of 8 deg. relative to the counter knife 6. The cut starts on the left side of the beater bars 1 and ends on the right side, and due to the close sequence of the beater bars 1, the cut material, which has a certain elasticity, can no longer spring back.

It is preferred to arrange the beater bars angularly apart in the range of about 15° to 20° relative to the axis of rotation. In FIG. 1 there are 18 beater bars 1 mounted on the cutter drums 5 arranged at an angle α of 20° apart.

It is obvious that, because of the great number of beater bars, the interruptions with which the continuously fed material is fed are shorter.

In the comminution of corn cobs according to the invention the membranous leaves are removed from the cut material cushion completely uncut or coarse-structured, due to the elasticity remaining only in the latter.

We claim:

1. Forage harvester, particularly for corn ear harvesting and pulverizing, comprising a counterknife arranged in the inlet of the harvester and having a cutting edge, a cutter assembly, said cutter assembly comprising a cutter support member rotatable about an axis spaced laterally from and substantially parallel with the cutting edge of said counterknife, said cutter support member having a circumferential periphery extending around the axis thereof, said counterknife spaced outwardly from the circumferential periphery of said cutter support member, a plurality of spaced knife supports mounted on spaced uniformly angularly apart around the circumferential periphery of said cutter support member, said knife supports projecting outwardly from the circumferential periphery of said cutter support member, a beater bar displaceably mounted on and extending outwardly from each said knife support away from said cutter support, each said beater bar having a straight impact edge spaced outwardly from said knife support and said impact edge arranged to cooperate with said counterknife so that said beater bar serves as a forage knife, said counterknife having a first side surface disposed in a plane substantially radial relative to the axis of said cutter support member and facing in the direction opposite to the direction of rotation of said cutter support member and said cutting edge of said couterknife located along the edge of said first side surface closer to said cutter support member, said beater bars each having a side surface leading in the direction of rotation of said cutter support member and extending outwardly in a plane intersecting the periphery of said cutter support member with the plane of the leading side surface disposed at an angle of about 8 degrees to a radial plane of said cutter support member extending through the axis thereof and through the intersection of the impact edge and the leading side surface of said beater bar, and said beater bars being angularly spaced apart about the circumferential periphery of said cutter support member in the range of about 15° to 20° relative to the axis of said cutter support member, and said cutter support member, said knife supports and said beater bars being dimensioned so that the dimension between the adjacent said impact edges on said beater bars is in the range of 60°–100 mm.

2. Forage harvester, as set forth in claim 1, wherein said straight impact edge of said beater bar is disposed at an angle to the axis of rotation of said cutter support member so that as said beater bar rotates past said counterknife one end of said impact edge traverses said counterknife ahead of the other end thereof.

3. Forage harvester, as set forth in claim 2, wherein each said straight impact edge is equally spaced from the axis of rotation of said cutter support member.

4. Forage harvester as set forth in claim 1, wherein said cutter support member comprises a disc wheel.

5. Forage harvester, as set forth in claim 1, wherein said cutter support member comprises a cutting drum including a pair of laterally spaced disc wheels.

6. Forage harvester, as set forth in claim 1, wherein each said knife support has a side surface leading in the direction of rotation of said cutter support member disposed in a plane parallel to the leading side surface of said beater bars, said beater bars each screw-connected to the leading side surface of the associated said knife support.

* * * * *

UNITED STATES PATENT OFFICE
CERTIFICATE OF CORRECTION

Patent No. 4,027,826      Dated June 7, 1977

Inventor(s) Klaus Grimm et al.

It is certified that error appears in the above-identified patent and that said Letters Patent are hereby corrected as shown below:

On the cover sheet delete

"[30] Foreign Application Priority Data

Feb. 7, 1975    Austria....941/75".

Signed and Sealed this twenty-third Day of August 1977

[SEAL]

Attest:

RUTH C. MASON
*Attesting Officer*

C. MARSHALL DANN
*Commissioner of Patents and Trademarks*